US008493996B2

(12) United States Patent
Strzyz et al.

(10) Patent No.: US 8,493,996 B2
(45) Date of Patent: Jul. 23, 2013

(54) AUTOMATIC CONNECTION RE-ESTABLISHMENT USING ESCAPE CARRIER

(75) Inventors: Stanislaw Strzyz, Poznan (PL);
Jaroslaw Lachowski, Nowy Sacz (PL);
Karol Drazynski, Wroclaw (PL);
Agnieszka Szufarska, Gdansk (PL);
Patryk Pisowacki, Wroclaw (PL);
Szymon Stefanski, Nowy Sacz (PL);
Klaus I. Pedersen, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 342 days.

(21) Appl. No.: 12/798,331

(22) Filed: Mar. 31, 2010

(65) Prior Publication Data

US 2011/0242965 A1    Oct. 6, 2011

(51) Int. Cl.
*H04L 12/50* (2006.01)
(52) U.S. Cl.
USPC .......................................... 370/465; 370/321
(58) Field of Classification Search
USPC .................................. 370/465, 321
See application file for complete search history.

(56) References Cited

U.S. PATENT DOCUMENTS

| 2010/0278141 | A1* | 11/2010 | Choi-Grogan et al. | 370/331 |
| 2010/0330993 | A1* | 12/2010 | Kone | 455/436 |
| 2011/0206011 | A1* | 8/2011 | Ishida et al. | 370/331 |
| 2011/0268085 | A1* | 11/2011 | Barany et al. | 370/331 |

OTHER PUBLICATIONS

3GPP TSG-RAN WG#67bis, Motorola, "Radio Link Failure in CSG Deployments", R2-095931, (Oct. 12-16, 2009), (2 pages).

3GPP TSG-RAN WG2 Meeting #66bis, Nokia Siemens Networks, Nokia Corporation,"UTRA Cell—DCH Mobility to UTRA and EUTRA CSG Cells", R2-093836, (Jun. 4-Jul. 3, 2009), (7 pages).
"Macro+HeNB performance with escape carrier", 3GPP TSG RAN WG1 #60 Meeting, R1-101453, Feb. 2010, 4 pgs.
"Use of Background Interference Matrix for Autonomous Component Carrier Selection for LTE-Advanced", 3GPP TSG RAN WG1 #55-bis Meeting, R1-090235, Jan. 2009, 7 pgs.
"3$^{rd}$ Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913 V9.0.0, Dec. 2009, 15 pgs.
"3$^{rd}$ Generation Partnership Project; Technical Specification Group radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.8.0, Mar. 2009, 157 pgs.
"3$^{rd}$ Generation Partnership Project; Technical Specification Group Radio Access Network; Evolved Universal Terrestrial Radio Access (E-UTRA) Radio Resource Control (RRC); Protocol specification (Release 9)", 3GPP TS 36.331 V9.1.0 , Dec. 2009, 233 pgs.

* cited by examiner

*Primary Examiner* — Luat Phung
(74) *Attorney, Agent, or Firm* — Harrington & Smith

(57) ABSTRACT

In one exemplary aspect of this invention a method includes receiving at a user equipment from a wide area network access node information identifying at least one predetermined radio frequency carrier; initiating, in response to a presence of an interferer on a radio frequency carrier that is being used for a current connection between the user equipment and the network access node, a connection re-establishment procedure, where the interferer has the potential to cause a radio link failure of the current connection on the radio frequency carrier; and transmitting a connection re-establishment request to the network access node on the predetermined radio frequency carrier. The interferer can be a closed subscriber group network access node that the user equipment is not authorized to gain access to.

15 Claims, 5 Drawing Sheets

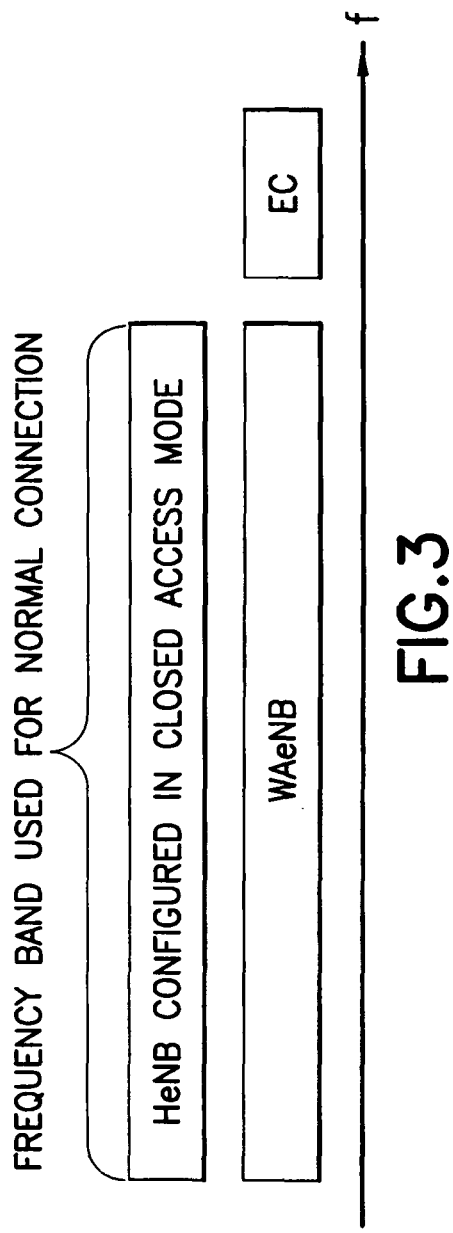

AUTOMATIC CONNECTION RE-ESTABLISHMENT USING ESCAPE CARRIER

TECHNICAL FIELD

The exemplary and non-limiting embodiments of this invention relate generally to wireless communication systems, methods, devices and computer programs and, more specifically, relate to techniques to re-establish a connection between a mobile communication device and a wireless network access node.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| ACCS | autonomous component carrier selection |
| 3GPP | third generation partnership project |
| BS | base station |
| BW | bandwidth |
| CC | component carrier |
| CSG | closed subscriber group |
| DL | downlink (eNB towards UE) |
| EC | escape carrier |
| eNB | E-UTRAN Node B (evolved Node B) |
| EPC | evolved packet core |
| E-UTRAN | evolved UTRAN (LTE) |
| HeNB | home eNB |
| HO | handover |
| HSPA | high speed packet access |
| IMTA | international mobile telecommunications association |
| LTE | long term evolution of UTRAN (E-UTRAN) |
| LTE-A | LTE advanced |
| MAC | medium access control (layer 2, L2) |
| MM/MME | mobility management/mobility management entity |
| NodeB | base station |
| OFDMA | orthogonal frequency division multiple access |
| OAM | operations and maintenance |
| PDCP | packet data convergence protocol |
| PHY | physical (layer 1, L1) |
| Rel | release |
| RLC | radio link control |
| RLF | radio link failure |
| RRC | radio resource control |
| RRM | radio resource management |
| RSRP | reference signal received power |
| SC-FDMA | single carrier, frequency division multiple access |
| SGW | serving gateway |
| SINR | signal to interference plus noise ratio |
| UE | user equipment, such as a mobile station, mobile node or mobile terminal |
| UL | uplink (UE towards eNB) |
| UMTS | universal mobile telecommunications system |
| UTRAN | universal terrestrial radio access network |
| WA | wide area |
| WAeNB | wide area eNB |

One modern communication system is known as evolved UTRAN (E-UTRAN, also referred to as UTRAN-LTE or as E-UTRA). The DL access technique is OFDMA, and the UL access technique is SC-FDMA.

One specification of interest is 3GPP TS 36.300, V8.11.0 (2009-12), "3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8)," incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.1.0 (2009-9).

FIG. 1A reproduces FIG. 4.1 of 3GPP TS 36.300 V8.11.0, and shows the overall architecture of the EUTRAN system (Rel-8). The E-UTRAN system 2 includes eNBs, providing the E-UTRAN user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME by means of a S1 MME interface and to an S-GW by means of a S1 interface (MME/S-GW 4). The S1 interface supports a many-to-many relationship between MMEs/S-GWs and eNBs.

The eNB hosts the following functions:

functions for RRM: RRC, Radio Admission Control, Connection Mobility Control,

Dynamic allocation of resources to UEs in both UL and DL (scheduling);

IP header compression and encryption of the user data stream;

selection of a MME at UE attachment;

routing of User Plane data towards the EPC (MME/S-GW);

scheduling and transmission of paging messages (originated from the MME);

scheduling and transmission of broadcast information (originated from the MME or OAM); and a measurement and measurement reporting configuration for mobility and scheduling.

Also of interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for EUTRA (LTE-Advanced) (Release 9), incorporated by reference herein. A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows an example of the carrier aggregation, where M Rel-8 component carriers are combined together to form M×Rel-8 BW (e.g. 5×20 MHz=100 MHz given M=5). Rel-8 terminals receive/transmit on one component carrier, whereas LTE-A terminals may receive/transmit on multiple component carriers simultaneously to achieve higher (wider) bandwidths.

So-called femto stations are a base station class having a lower maximum transmit power (and smaller cell area) as compared to a typical macro cell BS, such as an LTE or LTE-A eNB, also referred to herein as a WAeNB. Femto stations are typically designed for indoor deployments, such as in private residences or public areas, including office environments. Such femto BSs may be referred to for convenience as a home eNB (HeNB), although their use is not restricted to a home or residence. As the femto stations are intended to be deployed and maintained individually by customers, their geographical location cannot be assumed as being known to the operator of the macro cell BSs. Furthermore, as the number of femto cells within a given macro cell area can potentially be large, the optimum configuration of HeNB parameters from a centralized OAM function can be difficult to accomplish in practice.

SUMMARY

The foregoing and other problems are overcome, and other advantages are realized, by the use of the exemplary embodiments of this invention.

In a first aspect thereof the exemplary embodiments of this invention provide a method that comprises receiving at a user equipment from a wide area network access node information identifying at least one predetermined radio frequency carrier; initiating, in response to a presence of an interferer on a radio frequency carrier that is being used for a current connection between the user equipment and the network access node, a connection re-establishment procedure, where the interferer has the potential to cause a radio link failure of the current connection on the radio frequency carrier; and transmitting a connection re-establishment request to the network access node on the predetermined radio frequency carrier.

In another aspect thereof the exemplary embodiments of this invention provide an apparatus that comprises a processor and a memory including computer program code. The memory and computer program code are configured to, with the processor, cause the apparatus at least to perform receiving at a user equipment from a wide area network access node information identifying at least one predetermined radio frequency carrier; initiating, in response to a presence of an interferer on a radio frequency carrier that is being used for a current connection between the user equipment and the network access node, a connection re-establishment procedure, where the interferer has the potential to cause a radio link failure of the current connection on the radio frequency carrier; and transmitting a connection re-establishment request to the network access node on the predetermined radio frequency carrier.

In a further aspect thereof the exemplary embodiments of this invention provide a method that comprises transmitting to a user equipment from a wide area network access node information identifying at least one predetermined radio frequency carrier and, while connected to the user equipment on a radio frequency carrier other than the at least one predetermined radio frequency carrier, and in response to receiving a connection re-establishment request at the network access node on the predetermined radio frequency carrier, re-establishing the connection on the predetermined radio frequency carrier using a context that was in use for the connection on the radio frequency carrier.

In still another aspect thereof the exemplary embodiments of this invention provide an apparatus that comprises a processor and a memory including computer program code. The memory and computer program code are configured to, with the processor, cause the apparatus at least to perform transmitting to a user equipment from a wide area network access node information identifying at least one predetermined radio frequency carrier and, while connected to the user equipment on a radio frequency carrier other than the at least one predetermined radio frequency carrier, and in response to receiving a connection re-establishment request at the network access node on the predetermined radio frequency carrier, re-establishing the connection on the predetermined radio frequency carrier using a context that was in use for the connection on the radio frequency carrier.

BRIEF DESCRIPTION OF THE DRAWINGS

In the attached Drawing Figures:

FIG. 3 shows an exemplary frequency arrangement scenario between a HeNB and a WAeNB, and which further shows an emergency carrier located outside of the frequency band used for normal connections.

FIG. 4 reproduces a Table from Section 9.2.5 of 3GPP TS 36.331 V9.1.0 (2009-12), and shows various RRC-related timers and constants.

DETAILED DESCRIPTION

The exemplary embodiments of this invention relate generally to mobile wireless communication, such as 3GPP LTE and LTE-A. The exemplary embodiments of this invention relate more specifically to network optimization, automated configuration and interference reduction, such as in a use case of a wide area eNB with a femto cell (Home eNB, HeNB) co-channel deployment.

Figure 1A:
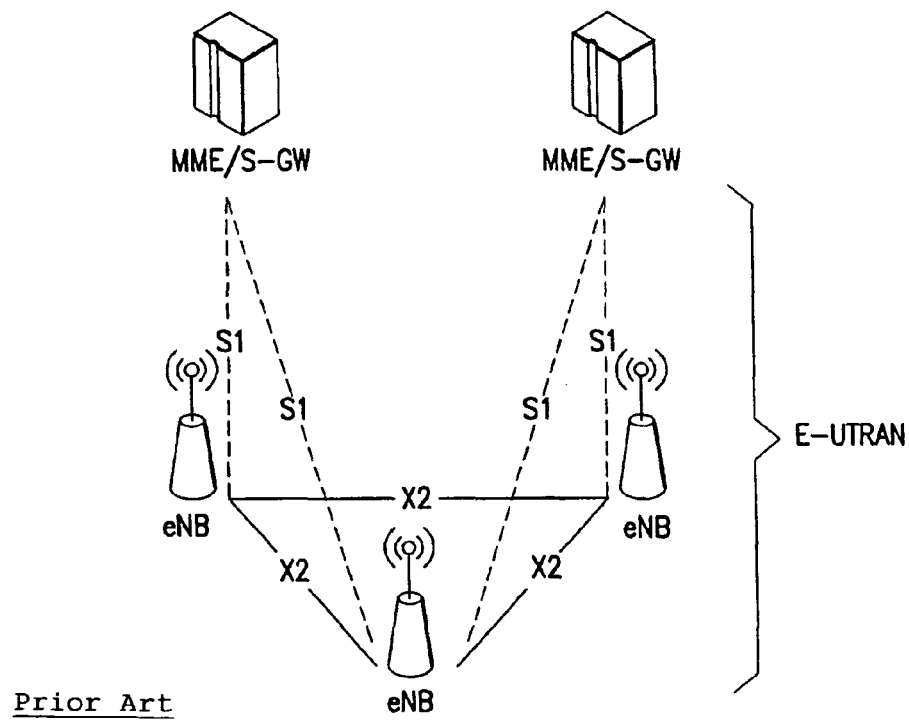
FIG. 1A reproduces FIG. 4.1 of 3GPP TS 36.300, and shows the overall architecture of the EUTRAN system.
Figure 1B:
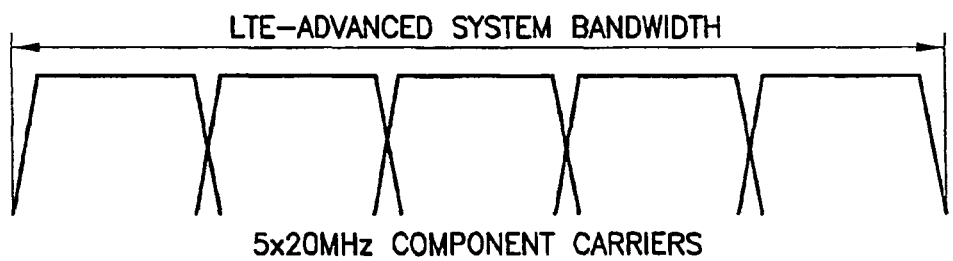
FIG. 1B shows an example of carrier aggregation as proposed for the LTE-A system.
Figure 2:
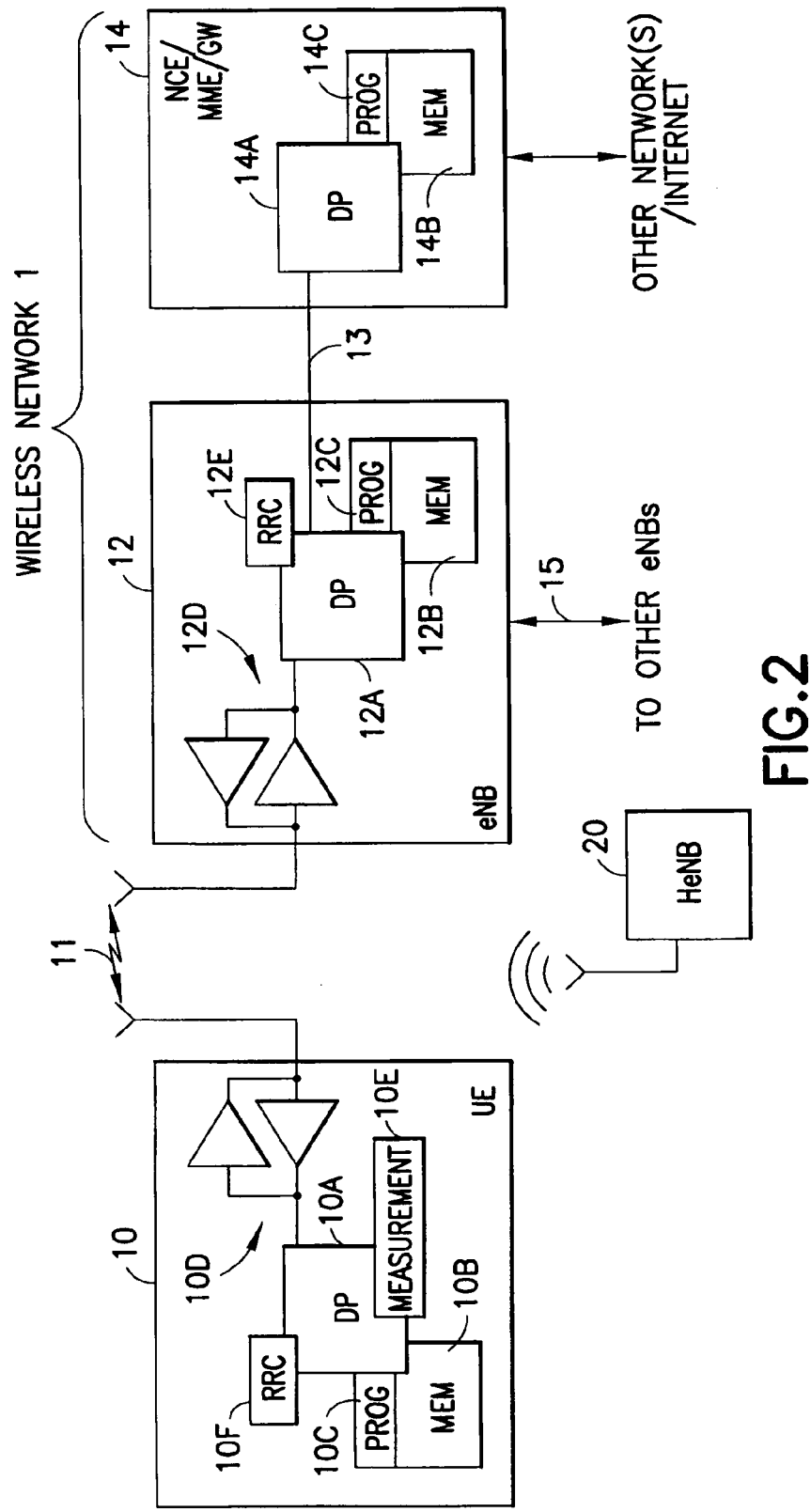
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12 (which may be referred to herein, without a loss of generality, as a WAeNB 12). The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as a computer or a data processor (DP) 10A, a non-transitory computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas (typically several when multiple input/multiple output (MIMO) operation is in use). The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

Also shown in FIG. 2, located with the macro cell coverage area (e.g., a wide area measured in kilometers) of the eNB 12, is a femto station 20, also referred to herein, without a loss of generality, as a HeNB 20. In a typical case there could be two or more HeNBs 20 present in the macrocell coverage area of the eNB 12. The coverage area of the HeNB 20 is assumed to be less than that of the eNB 12. For example, the coverage area of the HeNB 20 may just encompass a single building, while the coverage area of the eNB 12 may encompass some number of city blocks.

For the purposes of describing the exemplary embodiments of this invention the UE 10 can be assumed to also include a radio signal measurement unit (Measurement) 10E, and a RRC function or module 10F. The eNB 12 may be assumed to include a corresponding RRC function or module 12E. In one exemplary embodiment the RRC modules 10F, 12E can be compatible with, and configured to operate using, the RRC procedures defined in 3GPP TS 36.331 V9.1.0 (2009-12) Technical Specification 3rd Generation Partnership Project; Technical Specification Group Radio Access Network; Evolved Universal Terrestrial Radio Access (E-UTRA) Radio Resource Control (RRC); Protocol specification (Release 9).

The PROGs 10C and 12C are assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

An important feature of the HeNB 20 is the ability to restrict access for non-authorized users. This is done by means of a CSG configuration in which the node owner/administrator is able to define a list of authorized subscribers who have access to the associated femto cell(s). These authorized subscribers form the members of the closed subscriber group. Another user, not a member of the CSG, can be denied service by the HeNB 20.

It has been realized that introducing one or more CSG HeNBs 20 operating in the same frequency band as a wide area cell can result in interference problems. One of the more critical problems arises when the UE 10 that is connected to the macro NB (eNB 12) is interfered with by a CSG HeNB 20 to which it has no access permission.

Simulation results can show that in such a case the signal level from the WA cell in close proximity to a co-channel CSG femto cell can be reduced by, for example, 30 dB below the level of the signal of the CSG HeNB 20.

More specifically, a problem occurs when the UE 10 connected to the WAeNB 12 comes in proximity to a cell of a non-permitted CSG HeNB 20 that is using the same frequency band as the macro cell. The frequency arrangement scenario is depicted in FIG. 3. In such a scenario interference from the non-permitted CSG cell can be so high that the UE 10 might not be able to "hear" the WAeNB 12, resulting in an occurrence of a RLF. In particular this problem can occur when the UE 10 in the RRC_CONNECTED state enters a building in which a non-permitted CSG HeNB 20 is deployed.

One solution to this problem, that ensures good protection from unwanted DL interference (from HeNBs 20 to WA-connected UEs 10), is to use a so-called 'escape carrier' (EC). In this configuration one or more component carriers (one or more frequencies) in the coverage of the eNB 12 (macro cell) are banned from use by the HeNBs 20, thereby ensuring a safe frequency band for interfered macro UEs 10 to operate in. Note in FIG. 3 that the EC is shown to lie outside of the frequency band(s) used for normal connections.

Reference with respect to an escape carrier can be made to 3GPP TSG RAN WG1 #60 Meeting, R1-101453, San Francisco, United States, Feb. 22-26, 2010, Source: Nokia Siemens Networks, Nokia, Title: Macro+HeNB performance with escape carrier.

In an example, when the UE 10 is outside of the building the conditions are as follows:
the UE 10 is connected to the WA eNB 12;
the UE 10 uses a carrier that is not configured as the EC (the same as is used by the HeNB 20); and
the HeNB 20 which is within the building is not detectable by the UE 10 (e.g., due to wall penetration loss).

After the UE 10 enters the building the conditions are as follows:
the signal level from the WAeNB 12 is about 20 dB lower than for the outdoors case, due to wall penetration loss; and
the signal level from the HeNB 20 is about 20 dB higher than for the outdoors case, as it is no longer affected by the wall loss.

As a consequence of the foregoing the relationship between the signals from the WAeNB 12 and the HeNB 20 can change by about 40 dB. However, the UE 10 cannot connect to the HeNB 12, as it is not a member of the CSG of the HeNB 20, while the UE 10 can also no longer operate on the CC that it is using with the WAeNB 12 due to the SINR becoming too low on the CC.

In response to an occurrence of this situation the UE 10 can attempt to operate on the EC. However, as currently specified in order to move the UE 10 from the primary carrier of the WAeNB 12 to the EC the UE 10 is required to be in the connected state with the serving WAeNB 12 (which may not be possible in each case). Additionally, this change in carriers requires that the following steps be executed.

(A) The first step involves detecting the HeNB 20. According to 3GPP TS 36.133 the time required to identify an intra-frequency cell is at least 800 ms. Identification of a cell includes detection of a cell and, additionally, a measurement with a measurement period of 200 msec.

It should be noted that a single measurement report to the WAeNB 12 will not trigger frequency re-selection. Instead, several consecutive reports indicating the presence of a high interferer are needed to trigger frequency re-selection.

(B) A second step involves sending a command to the UE 10 to change the CC. However, the reception of this command may be problematic for the UE 10 due to the presence of the strong interferer (the HeNB 20).

It may be the case that the cumulative time needed to perform the foregoing actions is longer than the time needed for the user to enter the building. If such a situation occurs the call/data transmission will likely be dropped, even though the WAeNB 12 would be able to serve the UE 10 on the EC. If there is not sufficient time for the UE 10 to change to the EC a RLF can result.

The exemplary embodiments of this invention overcome the foregoing and other problems.

It is first noted that various timers and constants are referred to below. Reference can be made to FIG. 4, which reproduces the Table from Section 9.2.5 of 3GPP TS 36.331 V9.1.0 (2009-12).

In a first aspect of the exemplary embodiments, and for a case where an EC is configured for a given WAeNB 12, the EC information is provided (e.g., using a broadcast channel) to all UEs 10 served by the WAeNB 12. The information can include, for example, the carrier frequency and frequency band. The received EC-related information is stored in the UE 10.

In a second aspect of the exemplary embodiments, when the connection with the UE 10 is lost due to some sudden increase of interference on the serving carrier, e.g., upon detection of N310 consecutive out-of-synchronization frames occurring due to some reason other than, for example, a HO failure, the following actions can occur.

(a) The UE 10 can reduce the time measured by timer T310 (1000 msec according to the Table shown in FIG. 4) after which the RLF state occurs, thereby speeding up the entry into the RLF state.

(b) The UE 10 reconfigures its radio (transceiver 10D) according to the stored EC information and performs the connection re-establishment procedure using the specified EC (see 3GPP TS 36.331, Section 5.3.7, "RRC connection re-establishment").

(c) If the WAeNB 12 detects that it has received from the UE 10 the RRCConnectionReestablishmentRequest on the EC, it uses the same UE 10 context as was used during the transmission on the primary carrier to resume the connection to the UE 10 on the EC.

The EC can be, for example, an unoccupied carrier that is closest to the HeNB 20 component carrier, in a case where an ACCS-like approach is in use. The EC can differ locally within the coverage area of the WAeNB 12, i.e., there can be multiple ECs defined within the coverage area of the WAeNB 12.

Reference with regard to ACCS may be made, for example, to 3GPP TSG RAN WG1 #55-bis Meeting, R1-090235, Ljubljana, Slovenia, Jan. 12-16, 2009, Source: Nokia Siemens Networks, Nokia, Title: Use of Background Interference Matrix for Autonomous Component Carrier Selection for LTE-Advanced. Section 2 discusses an ACCS selection scheme, where it is proposed that each cell automatically selects one of the component carriers as its primary carrier (also sometimes referred to as the base carrier) when the eNB is powered on. The primary carrier is assumed to be used for initial connection of terminals in the cell. Depending on the offered traffic in cell and the mutual interference coupling with the surrounding cells, transmission and/or reception on all component carriers may not always be the best solution, especially for cell-edge users. It is proposed in R1-090235 that each cell dynamically selects additional component carriers for transmission/reception as well (i.e., a second step after having selected the primary component carrier). The latter is referred to as selection of secondary component carriers (also sometimes called extended carriers). All component carriers not selected for primary or secondary are assumed to be completely muted (uplink/downlink) and not used by the cell. The proposed scheme uses a distributed and fully scalable approach, i.e., selection of primary and secondary carriers is done locally by each cell. Hence, in the proposed configuration there is no need for centralized network control.

Describing now the exemplary embodiments of this invention in further detail, the first step assumes that the UE 10 is made aware of the existence of an EC within the cell of the WAeNB 12. In order to achieve this goal the channel configuration of the EC can be broadcast in the macro cell (or otherwise provided to the UE 10, e.g., via dedicated signaling) while the UE 10 is still in the connected state on a carrier other than the EC.

Having acquired this information the UE 10 treats the EC as a default carrier to be used if the RRC Connection Reestablishment procedure is needed in the case of a connection failure (RLF) on any carrier.

In response to detecting a sudden increase of (interfering) signal strength originating from a non-permitted CSG cell, that would cause the UE 10 to lose synchronization with its current cell, the UE 10 can reduce the value of timer T310 that leads to the RLF state, thereby resulting in a faster occurrence of the RLF state. The timer is then started, and when it expires a RLF is declared to have occurred. The value of the timer can be reduced by some predetermined amount (e.g., by an amount in a range of about 50% to about 80% of the standard value). Alternatively, the amount of the reduction can be variable. For example, the higher the level of the interfering signal the more the timer value can be reduced.

In response to the occurrence of the RLF state, due to reasons described above, the UE 10 can reconfigure the transceiver 10D immediately to the frequency indicated in the previously received and stored EC information element, without performing the conventional time-consuming steps discussed above (which additionally do not guarantee a successful connection re-establishment). After reconfiguration to the pre-provisioned EC the UE 10 sends the RRCConnectionReestablishmentRequest message as it normally would as specified in, for example, 3GPP 36.331, Section 5.3.7.

Having received the RRCConnectionReestablishmentRequest message on the EC the WAeNB 12 resumes communication with the UE 10 on the EC, using the previous context established for the UE 10. The context can be assumed to include any applicable radio and logical parameters that were in use including (as non-limiting examples), but not limited to, measurement configuration in the source cell, radio configuration in the source cell, security configuration (AS integrity protection and AS ciphering) used in the source cell, source Master Information Block, System Information Block 1, System Information Block 2, number of antenna ports in the source cell, downlink EARFCN (E-UTRAN Absolute Radio Frequency Channel Number) in the source cell, and so forth.

Further in this regard, and according to 3GPP TS 36.331v9.1.0, section 10.3, the AS-Config IE 'contains information about RRC configuration information in the source cell which can be utilized by the target cell to determine the need to change the RRC configuration during the handover preparation phase. The information can also be used after the handover is successfully performed or during the RRC connection reestablishment'. The parameters mentioned in the previous paragraph are exemplary of such configuration information, and can be understood to comprise at least part of the context established for the UE 10.

After being connected via the EC, the UE 10 can use the measurement unit 10E to measure that radio conditions on the previously used carrier (the one that was interfered with by the HeNB 20). If the radio conditions improve the UE 10 can be "handed over" to the original carrier.

As should be appreciated, only modest modifications are needed to existing operating procedures and standardization in order to implement the exemplary embodiments of this invention. One such modification is providing the signaling capability to inform the UE 10 of the identity of the EC or ECs in the macro cell. This can be accomplished using a broadcast (point-to-multipoint) channel or by dedicated (point-to-point) signaling between the WAeNB 12 and the UE 10 to convey the necessary information element (IE) or elements. Another modification involves, after expiration of T310 (possibly shortened as described above) and the start of T311 the UE 10, instead of dropping the connection or attempting to re-establish the connection on an intra-frequency channel instead sends the RCConnectionReestablishmentRequest on the EC. The WA eNB is modified as needed to send the EC-related information, and to respond appropriately to the receipt of the RCConnectionReestablishmentRequest on a previously defined EC.

It is noted that an aspect of the exemplary embodiments is the response that is made to the presence of an interferer in the radio environment of the UE 10. The interferer may be the HeNB 20. While described above generally in the context of the UE 10 actually detecting the presence of the interferer, in other embodiments the actual detection is not needed. For example, the exemplary embodiments also pertain to a situation where the UE 10 simply loses the connection to the WAeNB 12 due to, for example, a rapid increase in the power of interference, without first actually detecting the presence of the interferer.

Based on the foregoing it should be apparent that the exemplary embodiments of this invention provide a method, apparatus and computer program(s) to resume a connection much more quickly (and more reliably) than is possible using conventional RRC re-establishment techniques (e.g., the technique described in 3GPP TS 36.331, Section 5.3.7). The use of these exemplary embodiments provides for more reliable connections in the case of heterogeneous deployments.

Figure 5:
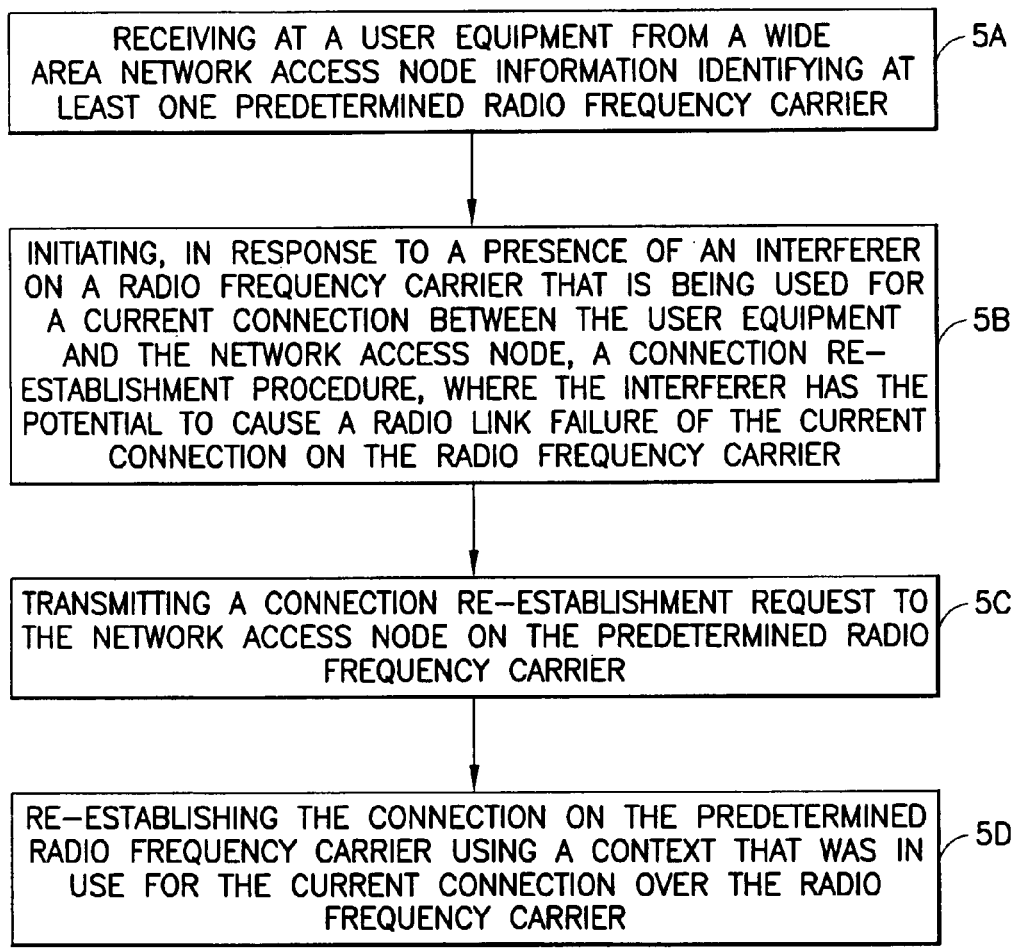
FIG. 5 is a logic flow diagram that illustrates the operation of a method, and a result of execution of computer program instructions embodied on a computer readable memory, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of receiving at a user equipment from a wide area network access node information identifying at least one predetermined radio frequency carrier. At Block 5B there is a step of initiating, in response to a presence of an interferer on a radio frequency carrier that is being used for a current connection between the user equipment and the network access node, a connection re-establishment procedure, where the interferer has the potential to cause a radio link failure of the current connection on the radio frequency carrier. At Block 5C there is a step of transmitting a connection re-establishment request to the network access node on the predetermined radio frequency carrier. At Block 5D there is a step of re-establishing the connection on the predetermined radio frequency carrier using a context that was in use for the current connection over the radio frequency carrier.

In the foregoing method the step of initiating can comprise reducing a value of a timer; starting the timer using the reduced value; and when the timer expires, declaring that a radio link failure has occurred, where transmitting is performed in response to the radio link failure having occurred.

In the foregoing method the information can be received from a broadcast channel, or it can be received using dedicated, point-to-point signaling.

In the foregoing method, and in response to determining that the interferer is no longer present on the original radio frequency carrier that was being used for the current connection, there can be an additional step of handing over the connection from the predetermined radio frequency carrier to the original radio frequency carrier.

In the foregoing method, the interferer can comprise a home network access node having a coverage area that is smaller than a coverage area of the wide area network access node.

The interferer can comprise a closed subscriber group network access node that the user equipment is not authorized to gain access to.

The foregoing method can be performed as a result of execution of computer program instructions stored in a non-transitory computer-readable medium that comprises part of the user equipment.

Figure 6:
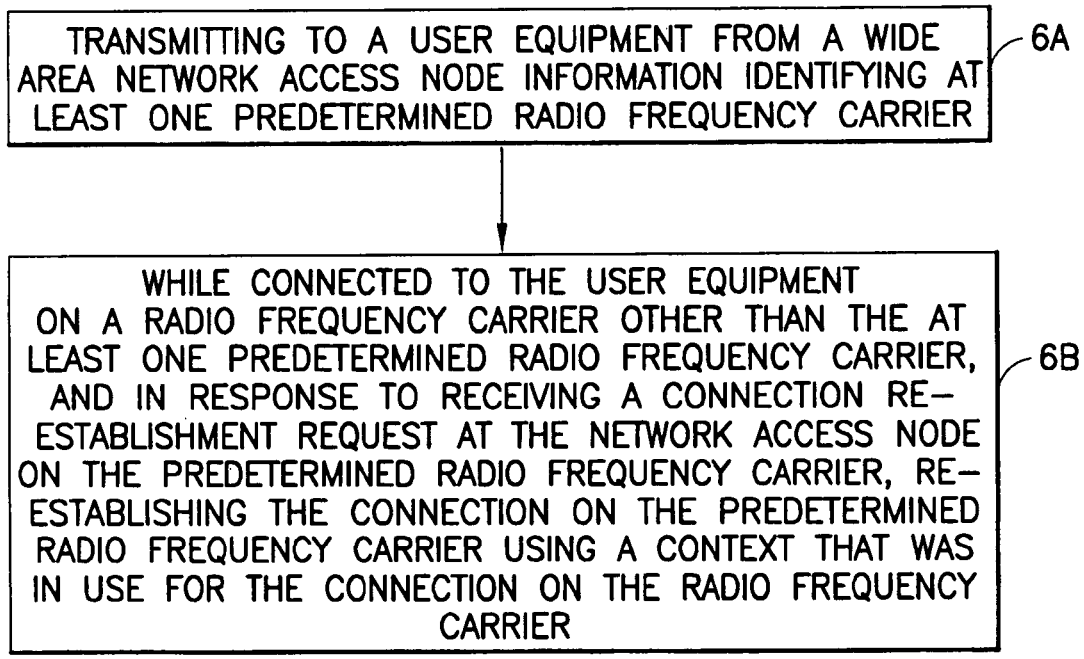
FIG. 6 is another logic flow diagram that illustrates the operation of a method, and a result of execution of computer program instructions embodied on a computer readable memory, further in accordance with the exemplary embodiments of this invention.

FIG. 6 is a logic flow diagram that illustrates the operation of a method, and a result of execution of computer program instructions, further in accordance with the exemplary embodiments of this invention. In accordance with these exemplary embodiments a method performs, at Block 6A, a step of transmitting to a user equipment from a wide area network access node information identifying at least one predetermined radio frequency carrier. At Block 6B there is a step performed, while connected to the user equipment on a radio frequency carrier other than the at least one predetermined radio frequency carrier, and in response to receiving a connection re-establishment request at the network access node on the predetermined radio frequency carrier, re-establishing the connection on the predetermined radio frequency carrier using a context that was in use for the connection on the radio frequency carrier.

In the foregoing method the information is transmitted using a broadcast channel or by using dedicated, point-to-point signaling.

In the foregoing method there can be an additional step performed of handing over the connection from the predetermined radio frequency carrier back to the original radio frequency carrier.

The foregoing method can be performed as a result of execution of computer program instructions stored in a non-transitory computer-readable medium that comprises part of the network access node.

The various blocks shown in FIGS. 5 and 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the (UTRAN LTE and LTE-A) systems, it should be appreciated that the exemplary embodiments of this invention are not limited for use with only these particular types of wireless communication systems, and that they may be used to advantage in other wireless communication systems. For example, the exemplary embodiments are applicable for use with femto nodes in the HSPA/UMTS radio access technology, when the multi-carrier/multi-band concept is introduced and applied.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described timers and parameters (e.g., T310, T311, etc.) are not intended to be limiting in any respect, as these timers and parameters may be identified by any suitable names. Further, the various names assigned to different elements and messages (e.g., emergency carrier, RCConnectionReestablishmentRequest, etc.) are not intended to be limiting in any respect, as these various elements messages may be identified by any suitable names. For example, the EC could just as easily be referred to instead as a "backup" carrier, or as a "re-connection" carrier.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
receiving at a user equipment from a wide area network access node information identifying at least one predetermined radio frequency carrier;
initiating, in response to a presence of an interferer on a radio frequency carrier that is being used for a current connection between the user equipment and the network access node, a connection re-establishment procedure, where the interferer has the potential to cause a radio link failure of the current connection on the radio frequency carrier; and
transmitting a connection re-establishment request to the network access node on the predetermined radio frequency carrier, where initiating comprises
reducing a value of a timer from a predetermined standard value to a reduced value that is less than the predetermined standard value;
starting the timer using the reduced value; and
when the timer expires, declaring that a radio link failure has occurred, where transmitting is performed in response to the radio link failure having occurred.

2. The method of claim 1, where the predetermined standard value is 1000 milliseconds and where the reduced value is one of a predetermined reduced value or a reduced value that is a function of an amount of interference caused by the interferer.

3. The method as in claim 1, where the information is received from a broadcast channel.

4. The method as in claim 1, where the information is received using dedicated, point-to-point signaling.

5. The method as in claim 1, further comprising re-establishing the connection on the predetermined radio frequency carrier using a context that was in use for the current connection over the radio frequency carrier.

6. The method as in claim 5, further comprising determining that the interferer is no longer present on the original radio frequency carrier that was being used for the current connection, and handing over the connection from the predetermined radio frequency carrier to the original radio frequency carrier.

7. The method as in claim 1, where the interferer comprises a home network access node having a coverage area that is smaller than a coverage area of the wide area network access node.

8. The method as in claim 1, where the interferer comprises a closed subscriber group network access node that the user equipment is not authorized to gain access to.

9. The method as in claim 1, performed as a result of execution of computer program instructions stored in a non-transitory computer-readable medium that comprises part of the user equipment.

10. An apparatus, comprising:
a processor; and
a memory including computer program code, where the memory and computer program code are configured to, with the processor, cause the apparatus at least to perform,
receiving at a user equipment from a wide area network access node information identifying at least one predetermined radio frequency carrier;
initiating, in response to a presence of an interferer on a radio frequency carrier that is being used for a current connection between the user equipment and the network access node, a connection re-establishment procedure, where the interferer has the potential to cause a radio link failure of the current connection on the radio frequency carrier; and
transmitting a connection re-establishment request to the network access node on the predetermined radio frequency carrier, where initiating comprises
reducing a value of a timer from a predetermined standard value to a reduced value that is less than the predetermined standard value;
starting the timer using the reduced value; and
when the timer expires, declaring that a radio link failure has occurred, where transmitting is performed in response to the radio link failure having occurred.

11. The apparatus of claim 10, where the predetermined standard value is 1000 milliseconds and where the reduced value is one of a predetermined reduced value or a reduced value that is a function of an amount of interference caused by the interferer.

12. The apparatus as in claim 10, where the information is received from a broadcast channel or is received using dedicated, point-to-point signaling.

13. The apparatus as in claim 10, further comprising re-establishing the connection on the predetermined radio frequency carrier using a context that was in use for the current connection over the radio frequency carrier.

14. The apparatus as in claim 13, further comprising determining that the interferer is no longer present on the original radio frequency carrier that was being used for the current connection, and handing over the connection from the predetermined radio frequency carrier to the original radio frequency carrier.

15. The apparatus as in claim 10, where the interferer comprises a closed subscriber group network access node that the user equipment is not authorized to gain access to.

* * * * *